(No Model.)
J. GEHRING.
COMBINED SAW JOINTER, SET, AND GAGE.
No. 285,609. Patented Sept. 25, 1883.
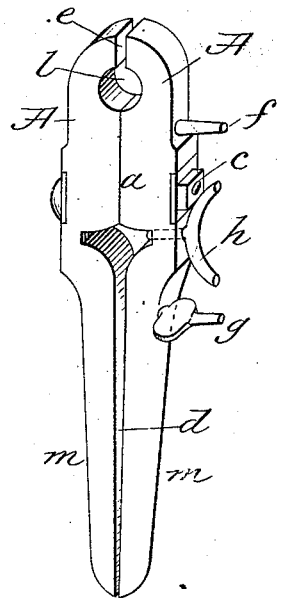
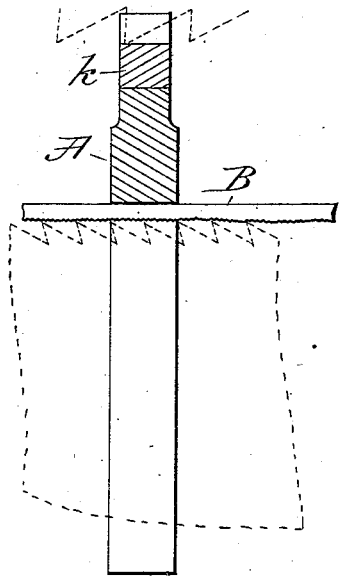
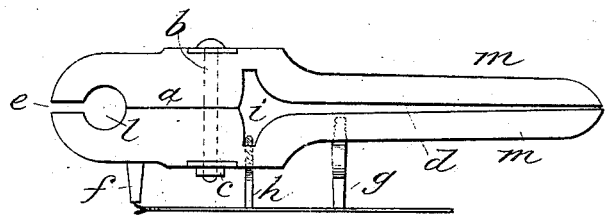
Attest:
F. H. Schott
A. R. Brown
Inventor:
Jacob Gehring

UNITED STATES PATENT OFFICE.

JACOB GEHRING, OF RIDGEVILLE CORNERS, OHIO.

COMBINED SAW JOINTER, SET, AND GAGE.

SPECIFICATION forming part of Letters Patent No. 285,609, dated September 25, 1883.

Application filed June 6, 1883. (No model.)

*To all whom it may concern:*

Be it known that I, JACOB GEHRING, a citizen of the United States, residing at Ridgeville Corners, in the county of Henry and State of Ohio, have invented certain new and useful Improvements in Combined Saw Jointer, Set, and Gage; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a device for jointing, setting, and gaging saw-teeth; and it consists in the construction and arrangement of parts, as hereinafter more fully described, and specifically pointed out in the claim.

In the annexed drawings, illustrating the invention, Figure 1 is a perspective view of my improved saw jointer, set, and gage. Fig. 2 is a sectional view of the same, showing the manner of using the implement as a jointer and set; and Fig. 3 is a side view of the implement, showing the manner in which it is employed as a gage.

Like letters of reference designate like parts in the several views.

The implement consists of two parts, A A, shaped as shown in Figs. 1 and 3, and connected through the body *a* by a bolt, *b*, and nut *c*, Fig. 3, so as to form the slots *d e*. On one edge of the tool is a stationary pin, *f*, and a set-screw, *g*, also a thumb-screw, *h*, having a bifurcated end.

The saw to be jointed is placed in the long slot *d*, with its teeth resting against a file, B, that is held by the thumb-screw *h* in an enlargement, *i*, of said slot. After the teeth of the saw have been jointed or reduced to a uniform length by the action of the file, they may have the requisite set imparted to them by removing the implement, then applying its slotted end *e* to each tooth and bending them to the right and left, respectively. A plug, *k*, of wood or other suitable material, is placed in the circular recess *l* at the inner end of the slot *e* to protect the points of the teeth while being set. When the teeth have been set, they are gaged by adjusting the set-screw *g* and thumb-screw *h* to the proper relative length with that of the stationary pin *f*, which is applied to the point of each tooth, as shown in Fig. 3, the screws *g h* resting on the saw-blade in such manner that the bifurcated portion of the thumb-screw *h* will form a broad bearing and prevent rocking of the implement, and consequently obviate any liability of inaccurate gaging. If it is found that any tooth of the saw does not have the requisite set, it may be readily bent to the right or left, as required, by means of the slotted end *e* of the implement. The arms *m m*, that form the sides of the jointing-slot *d*, serve to give the implement a long bearing upon the sides of the saw in jointing its teeth, and also form a handle when the tool is used as a saw-set or a gage.

Having thus described my invention, what I claim as new, and desire to secure by Letters Patent, is—

A combined saw jointer, set, and gage, consisting of the parts A A, connected by a bolt, *b*, and nut *c*, and provided with a jointing-slot, *d*, having an enlargement, *i*, for receiving a file, a setting-slot, *e*, plug *k*, gage-pin *f*, set-screw *g*, and a thumb-screw, *h*, having a bifurcated end, substantially as shown and described.

In testimony whereof I affix my signature in presence of two witnesses.

JACOB GEHRING.

Witnesses:
WILLIAM GUHL,
HENRY BREDT.